US008839384B2

(12) United States Patent
Roy et al.

(10) Patent No.: US 8,839,384 B2
(45) Date of Patent: Sep. 16, 2014

(54) PROPAGATING USER PRIVACY PREFERENCES ACROSS MULTIPLE APPLICATIONS

(75) Inventors: Siddhartha Roy, Kirkland, WA (US); Sijian Zhang, Bellevue, WA (US); Michael Elizarov, Sammamish, WA (US); Shaoyu Zhou, Issaquah, WA (US); Fei Cao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/873,394

(22) Filed: Sep. 1, 2010

(65) Prior Publication Data

US 2012/0054821 A1 Mar. 1, 2012

(51) Int. Cl.
*G06F 7/04* (2006.01)
*G06F 21/62* (2013.01)
*G06F 21/60* (2013.01)
*H04L 29/06* (2006.01)

(52) U.S. Cl.
CPC ........... *G06F 21/6245* (2013.01); *H04L 63/102* (2013.01); *G06F 21/604* (2013.01); *G06F 21/6209* (2013.01)
USPC ........... 726/6; 715/745; 705/14.4; 705/14.66; 705/14.73

(58) Field of Classification Search
USPC ................................ 726/6; 707/607; 715/745
See application file for complete search history.

(56) References Cited

U.S. PATENT DOCUMENTS

| 6,993,246 | B1 * | 1/2006 | Pan et al. ...................... 386/201 |
| 7,257,546 | B2 * | 8/2007 | Ebrahimi et al. .......... 705/14.73 |
| 7,343,375 | B1 | 3/2008 | Dulac |
| 7,409,145 | B2 * | 8/2008 | Antoun et al. ................ 386/248 |
| 7,526,485 | B2 | 4/2009 | Hagan |
| 7,614,002 | B2 | 11/2009 | Goldfeder |
| 7,792,813 | B2 * | 9/2010 | Selberg ........................ 707/706 |

(Continued)

OTHER PUBLICATIONS

Jules Polonetsky & Christopher Wolf, "Future of Privacy Forum: FPF's Reply Comments to the Federal Websites Cookie Policy" Webpage, Published Date: Aug. 10, 2009, 3 pgs, website address: http://www.facebook.com/note.php?note_id=142322784637.

(Continued)

*Primary Examiner* — Aravind Moorthy
*Assistant Examiner* — Jason Plotkin
(74) *Attorney, Agent, or Firm* — Joann Dewey; Jade Fashokun; Micky Minhas (57) ABSTRACT

Methods and systems for maintaining user privacy preferences based on one or more user identifications across a plurality of applications are provided. Two or more user identifications are received with associated user privacy preferences. The received user identification is compared against other user identifications to determine if the user identifications relate to the same user. It may be determined that two user identifications are related if they have at least one browser property in common. A consolidated data stream of the user privacy preferences for the related user identifications is created. The consolidated data stream is communicated to one or more applications and propagated to maintain the user privacy preferences across the applications relating to the user identification.

19 Claims, 3 Drawing Sheets

(56) References Cited

U.S. PATENT DOCUMENTS

| | | | |
|---|---|---|---|
| 2007/0192121 A1* | 8/2007 | Routson | 705/1 |
| 2007/0240106 A1* | 10/2007 | Manson et al. | 717/110 |
| 2007/0244750 A1 | 10/2007 | Grannan | |
| 2008/0000970 A1* | 1/2008 | Savage et al. | 235/386 |
| 2008/0016232 A1* | 1/2008 | Yared et al. | 709/229 |
| 2009/0094114 A1 | 4/2009 | Rice | |
| 2009/0248680 A1 | 10/2009 | Kalavade | |
| 2009/0300509 A1* | 12/2009 | Mathew et al. | 715/739 |
| 2009/0300512 A1* | 12/2009 | Ahn | 715/747 |
| 2010/0274815 A1* | 10/2010 | Vanasco | 707/798 |
| 2010/0318432 A1* | 12/2010 | Zinkevich et al. | 705/14.71 |
| 2012/0233670 A1* | 9/2012 | Bonnes et al. | 726/4 |

OTHER PUBLICATIONS (No author listed), "Microsoft Announces Enhanced Privacy Protections for Customers," Webpage, Published Jul. 22, 2007, 3 pgs, website address: http://www.microsoft.com/presspass/press/2007/jul07/07-22EnhancedPrivacyPrinciplesPR.mspx.

(No author listed), "Microsoft Online Privacy Statement," webpage, published Oct. 2009, 4 pgs, website address: http://privacy.microsoft.com/en-us/fullnotice.mspx#EBG.

* cited by examiner

PROPAGATING USER PRIVACY PREFERENCES ACROSS MULTIPLE APPLICATIONS

BACKGROUND

Online targeted advertising includes the responsibility of an advertisement network to offer a user a choice to opt out of the targeted advertising. Currently, the opt-out setting is usually implemented using a non-persistent cookie. In other situations, the opt-out state requires a user to log on to another online service. In the situation using a non-persistent cookie, clearing the browser cookies loses the opt-out state and therefore, causing the user to have to choose the opt-out state every time the cookies are cleared. The other situation, involving logging on to an online service, adds another step for the user to maintain the opt-out settings. Opt-out settings may include other online preferences settings such as targeted advertisement settings and pop-up settings but is not limited to only these settings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, propagating user privacy preferences across a plurality of applications. A plurality of user identifications, one or more of which is associated with a user privacy preference is received. It is then determined that at least two of the user identification relate to the same user. A consolidated data stream of the associated user privacy preferences for each of the related user identifications is created and then the consolidated data stream is propagated throughout one or more applications.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, for maintaining user privacy preferences based on user identifications across a plurality of applications. A plurality of user identifications with associated user privacy preferences are received and then it is determined that at least two of the user identifications relate to the same user. A consolidated data stream of the associated user privacy preferences for each of the related user identifications is created and then the consolidated data stream is propagated throughout one or more applications.

Accordingly, in one embodiment, the present invention is directed to one or more computer-readable storage media storing computer-useable instructions that, when used by one or more computing devices, cause the one or more computing devices to perform a method for propagating user privacy preferences based on one or more user identifications across a plurality of applications. The method comprising receiving a plurality of user identification each of the plurality of user identifications having an associated user privacy preference, determining that at least two of the plurality of user identifications relate to a particular user, creating a consolidated data stream of the user privacy preferences for each of the related user identifications, and propagating at least one of the associated user privacy preferences across the plurality of applications. The user identifications identify a user and the associated user privacy preferences indicate the user's desired privacy settings.

In another embodiment, the present invention is directed to a system for propagating user privacy preferences based on one or more user identifications across a plurality of applications. The system comprises a computing device associated with one or more processors and one or more computer-readable storage media, a data store coupled with the computing device, and a data processing device. The data processing device receives one or more user privacy preferences associated with one or more user identifications, determines that at least one of the user identifications is related to at least one of the other user identifications, creates a consolidated data stream of the one or more user privacy preferences associated with at least one of the user identifications, and communicates the consolidated data stream to one or more applications. Generally, the data store comprises information about the plurality of applications and user identification correlation information In yet another embodiment, the present invention is directed to one or more computer-readable storage media storing computer-useable instructions that, when used by one propagating user privacy preferences based on one or more user identifications across a plurality of applications. The method comprises receiving a first user identification having a first associated user privacy preference, wherein the first user identification identifies a user and the user privacy preference indicates the user's desired privacy settings, receiving a second user identification having a second associated user privacy preference, determining that the first user identification and the second user identification have at least one browser property in common, creating a consolidated data stream of at least the first and second associated user privacy preferences for the first and second user identifications, and communicating the consolidating data stream to the one or more applications for propagating the first and second associated privacy preferences for the user in the one or more applications.

Figure 1:
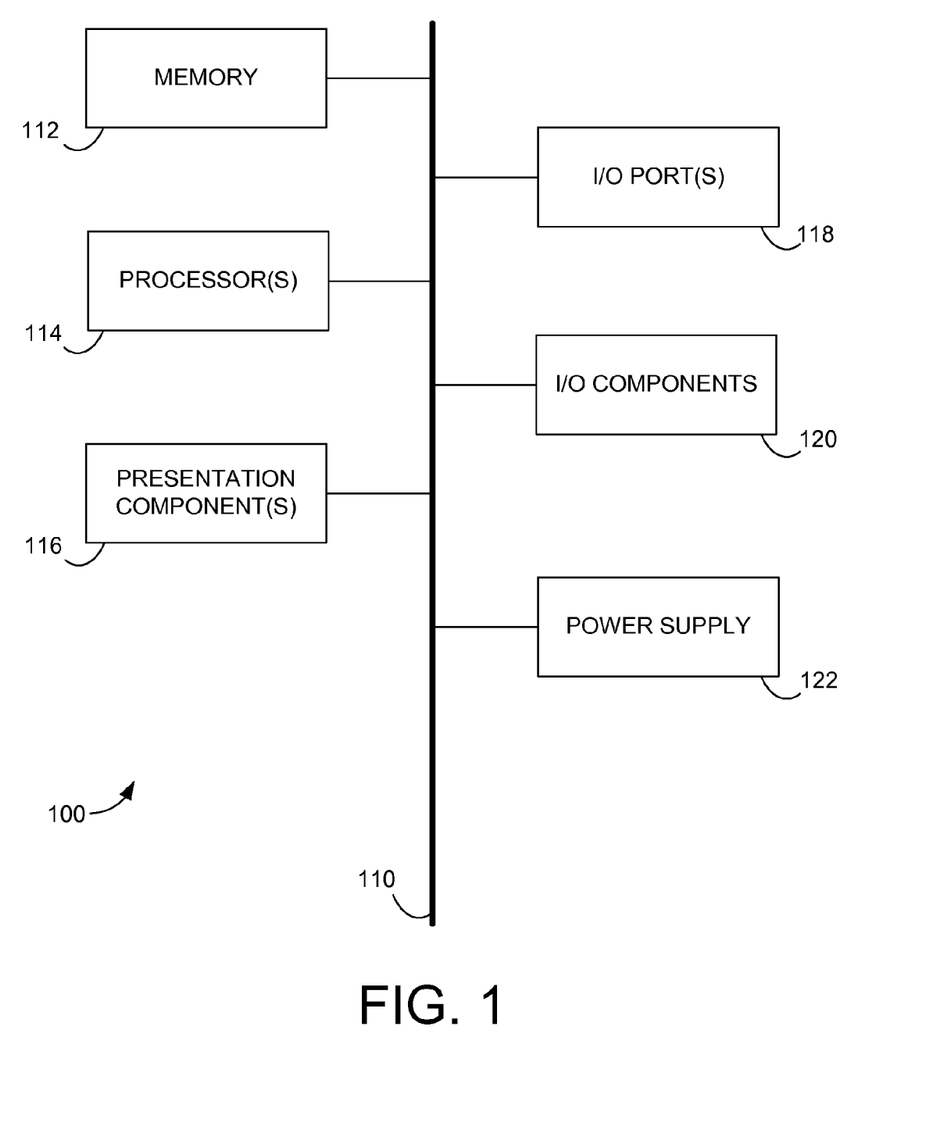
FIG. 1 is a block diagram of an exemplary computing system environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, a block diagram illustrating an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," and the like, as all are contemplated within the scope of FIG. 1 and reference to "computing device."

The computing device 100 typically includes a variety of computer-readable media. Computer-readable media can be any available media capable of being accessed by the computing device 100 and includes both volatile and nonvolatile media, removable and non-removable media. By way of example, and not limitation, computer-readable media may comprise computer-storage media and communication media, the two being mutually exclusive of one another. Computer-storage media includes volatile and nonvolatile, removable and non-removable media implemented in any method or technology for storage of information such as computer-readable instructions, data structures, program modules or other data. In this way, computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O component(s) 120, some of which may be built in. Illustrative components include a microphone, joystick, game pad, satellite dish, scanner, printer, wireless device, and the like.

Figure 2:
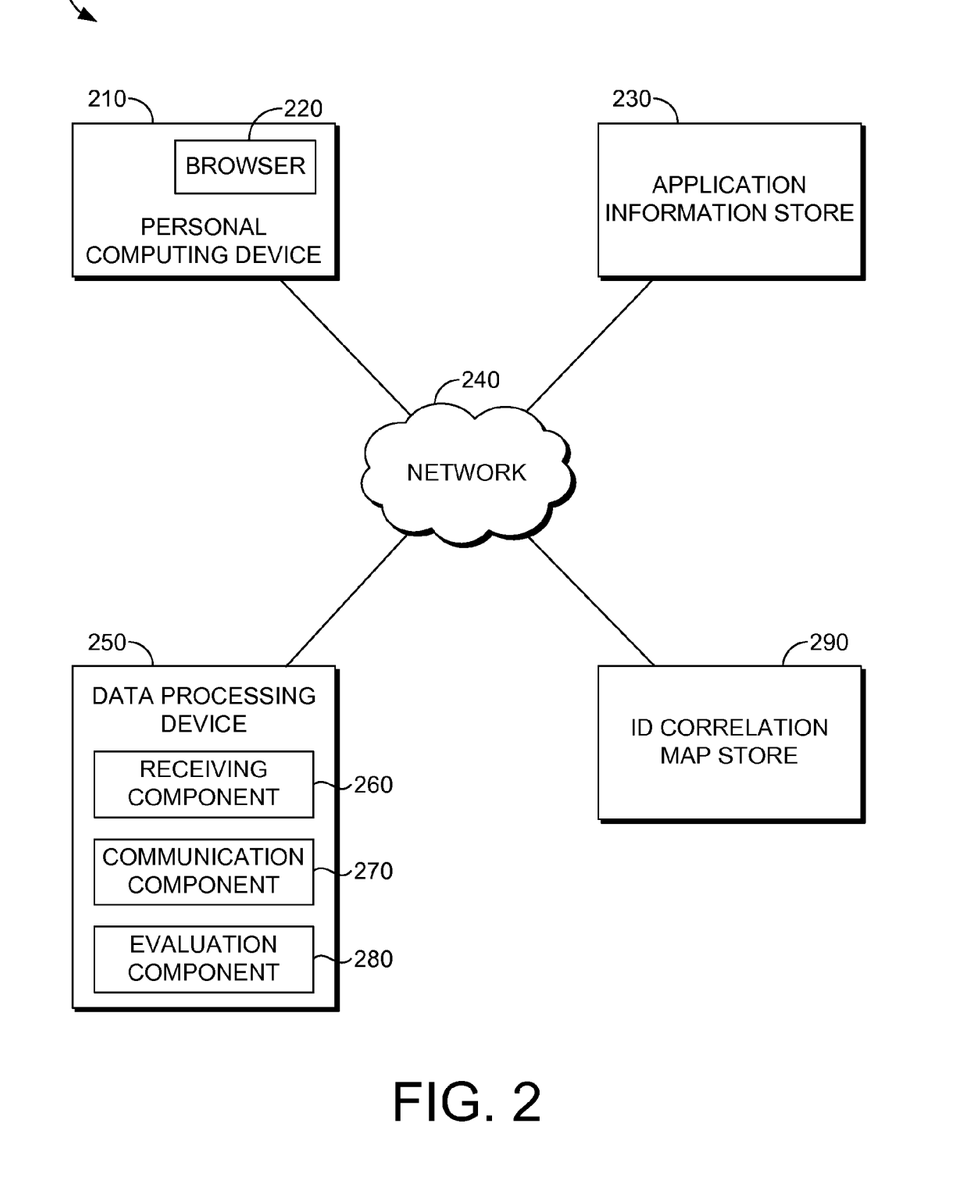
FIG. 2 is a schematic diagram showing an illustrative system for propagating user privacy preferences across a plurality of applications, in accordance with embodiments of the present invention.

As indicated previously, embodiments of the present invention are directed to maintaining user privacy preferences based on one or more user identifications across multiple applications. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a personal computing device 210, an application information store 230, a data processing device 250, and an identification correlation map store 290. The personal computing device 210 may include any type of computing device, such as computing device 100 described with reference to FIG. 1, for example. The personal computing device 210 may also include a browser 220 for accessing the Internet and any of the applications discussed herein. The components of the computing system 200 may communicate with each other via a network (e.g., network 240), which may include, without limitation, one or more local area networks (LANs) and/or wide area networks (WANs). Such networking environments are commonplace in offices, enterprise-wide computer networks, intranets and the Internet.

The application information store 230 is configured to store information, for instance, associated with user privacy preferences for applications. Such information may include, without limitation, user identifications, associated user preference settings (e.g., opt-out settings, targeted ad settings, pop-up ad settings, or the absence of any user privacy preference), and the like. In embodiments, application information store 230 is configured to be searchable for one or more of the user identifications.

The data processing device 250 is configured to process the privacy preferences associated with user identifications. The data processing device 250 may include any type of computing device, such as computing device 100 described with reference to FIG. 1, for example.

The identification correlation map store 290 is configured to store user identifications and correlations between the user identifications. The identification correlation map store 290 provides information correlating user identifications from different applications based on identifying information such as a browser property. In embodiments, the information stored in association with the identification correlation map store 290 is configured to be searchable.

It will be understood and appreciated by those of ordinary skill in the art that the information stored in the application information store 230, and/or the identification correlation map store 290 may be configurable and may include any information relevant to user identifications and associated user privacy preferences, and the like. The content and volume of such information are not intended to limit the scope of embodiments of the present invention in any way. Further, though illustrated as two, independent components, the application information store 230 and the identification correlation map store 290 may, in fact, be a single data store, and/or may have portions which reside on a server (not shown), the personal computing device 210, another external computing device (not shown) and/or any combination thereof.

It should be understood that any number of personal computing devices and data stores (e.g., application information store 230 and identification correlation map store 290) may be employed in the computing system 200 within the scope of embodiments of the present invention. Each may comprise a single device/module or multiple devices/modules cooperating in a distributed environment. Additionally, other components/modules not shown may also be included within the computing system 200.

In some embodiments, one or more of the illustrated components/modules may be implemented as stand-alone applications. In other embodiments, one or more of the illustrated components/modules may be implemented via the personal computing device 210, as an Internet-based service, or as a module inside a browser. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the data processing device 250 (more fully described below) might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which maintaining user privacy preferences based on one or more user identifications across a plurality of applications. As will be described in further detail below, embodiments of the present invention propagates a user's privacy preferences across different applications to maintain the settings previously set by the user. Therefore, even if a user clears the browser history or cookies, the privacy preferences will be maintained. Additionally, embodiments of the present invention permit privacy preferences including opt-out settings, targeted ad settings, a pop-up ad preference, the absence of any user privacy preference, and other settings.

With continued reference to FIG. 2, the data processing device 250 may include a receiving component 260, a communication component 270, and an evaluation component 280. The receiving component 260 is capable of receiving one or more user privacy preferences associated with one or more user identifications. The evaluation component 280 is capable of evaluating that one or more user identifications related to the same user using identification correlation from the identification correlation map store 290. The communication component 270 is capable of communicating a consolidated data stream of the one or more user privacy preferences associated with at least one of the user identifications to one or more applications.

The evaluation component 280 is configured to compare the received user identification(s) with the user identification stored in the identification correlation map store 290. Such determination may be made utilizing metadata conveyed, for example, via one or more of a browser property from, for example, the personal computing device 210 such as a user's IP address, a session ID, a cookie associated with the user, and a browser user agent. If the evaluation component 280 determines that two user identifications related to the same user, then the user identifications will be correlated in the identification correlation map store 290 for future reference. The evaluation component 280 may use a cookie graph to determine if the received user identification is related to another user identification.

Determining that one or more user identifications are related based on having a least one browser property in common, the communication component 270 may be configured to create a consolidated data stream of the user privacy preferences associated with the related user identifications. The consolidated data stream, communicated by the communication component 270, may be configured to be received by the application information store 230 to propagate privacy preferences across different applications for a particular user.

Also, it may be determined that the user identifications have conflicting associated user privacy preferences. Upon determining that the associated user privacy preferences are not conflicting, the associated privacy settings will be propagated to the one or more applications. Upon determining that at least two of the associated user privacy preferences are conflicted, the respective user privacy preferences associated with the user identifications having the conflicting settings may be maintained. For instance, the most recently set user privacy preferences might be determined to be the user privacy preference propagated while maintaining the conflicting privacy preference in the only the corresponding application.

Figure 3:
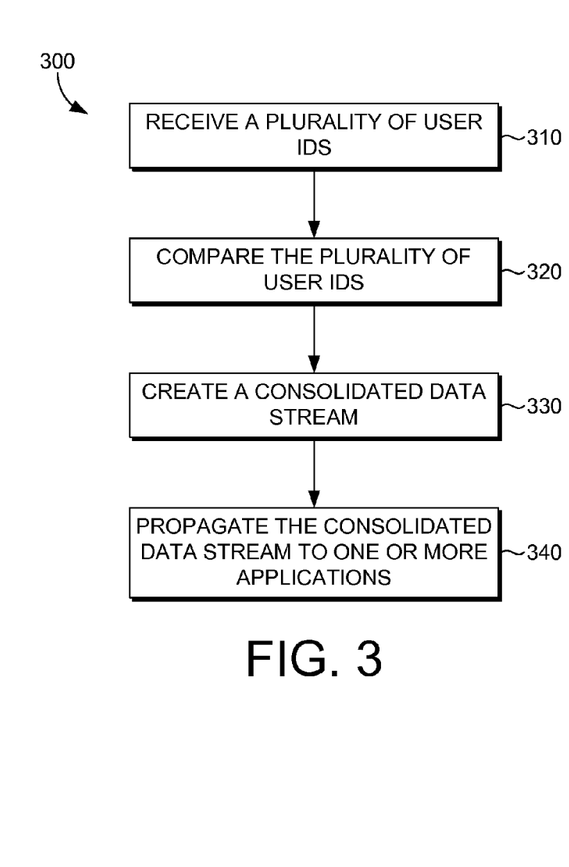
FIG. 3 is a flow diagram showing an exemplary method for propagating user privacy preferences across a plurality of applications, in accordance with embodiments of the present invention.

Turning now to FIG. 3, a flow diagram is illustrated showing a method 300 for maintaining user privacy preferences based on one or more user identifications across a plurality of applications, in accordance with an embodiment of the present invention. As indicated at block 310, a plurality of user identifications is received. For instance, one of the applications prompts a user to set privacy preferences and the user identification, associated privacy preferences, and browser properties are transmitted by the browser 220 of the personal computing device 210 to the data processing device 250 of FIG. 2. A user might have a different identification for each application.

As indicated at block 320, the plurality of user identifications is compared. For example, if a user has different user identification for each application but uses the browser 220 on the same personal computing device 210 of FIG. 2 to access each of the applications, then at least one of the browser properties associated with the user identification would be the same. The evaluation component 280 of FIG. 2 is configured to compare the user identifications by accessing the identification correlation map store 290 of FIG. 2. The identification correlation map store 290 may contain a database of user identifications with associated privacy preferences and browser properties. The evaluation component 280 correlates the user identifications based on the browser properties. Examples of browser properties include, but are not limited to IP address, browser user agent, a session ID, and a cookie associated with the user. The correlation of the user identifications is used to determine if user identifications relate to the same user.

The evaluation component 280 may use a cookie graph to determine if the received user identification is related to another user identification. Also, the user identifications may be correlated through a common mapped identification. For example, user identification relating to a user A (ID A) is determined to be related to a user identification relating to a user B (ID B) by some common properties, such as browser properties. A user identification relating to a user C (ID C) is determined to be related to ID B also by some common properties. Therefore, it may be determined that ID A and ID C are also correlated. Further, it may be determined that ID A, ID B, IDC all belong to the same user.

Once it is determined that at least two user identifications relate to the same user, a consolidated data stream of the privacy preferences associated with the related user identifications is created, as indicated at block 330. The consolidated data stream is created to easily transmit the related user identification and privacy preferences to multiple applications.

As indicated at block 340, the consolidated data stream is communicated to one or more applications. Once the consolidated data stream is received, the information contained within the data stream (e.g. privacy preferences) is propagated across all relevant applications. For example, once a user chooses to opt out of all targeted ads in a first application and it is determined that the user has a user identification for a second application, then the user will be opted out of targeted ads in the second application, as well as, for the first application.

Figure 4:
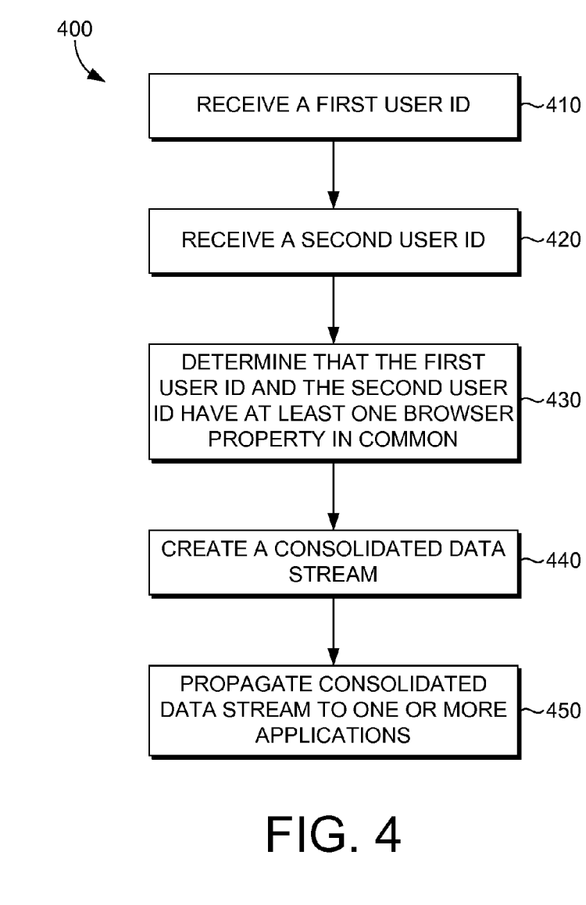
FIG. 4 is a flow diagram showing another exemplary method for propagating user privacy preferences across a plurality of applications, in accordance with embodiments of the present invention.

With reference to FIG. 4, a flow diagram is illustrated showing a method 400 for maintaining user privacy preferences based on one or more user identifications across multiple applications, in accordance with an embodiment of the present invention. As indicated at block 410, a first user identification and associated privacy preferences is received for a first user. For example, a user has indicated a privacy preference in at least one of the applications using browser 220 on the personal computing device 210 of FIG. 2. As indicated at block 420, a second user identification and associated privacy preferences are received. This may happen, for example, when a second user or the same user as in step 420 indicates a privacy preference. It should be appreciated that there are many different possibilities for the situations with different user identifications. For example, the user identifications might relate to the same user, or might be accessed on the same personal computing device 210 of FIG. 2, and the like.

As indicated by block 430, it is determined that the first user identification and the second user identification have at least one browser property in common. The evaluation component 280 of FIG. 2 is configured to compare the user identifications by accessing the identification correlation map store 290 of FIG. 2. The identification correlation map store 290 may contain a database of user identifications with associated privacy preferences and browser properties. The browser properties help to identify and differentiate the user identifications. The evaluation component 280 correlates the user identifications based on the browser properties. The correlation of the user identifications is used to determine if user identifications relate to the same user. Examples of browser properties include, but are not limited to IP address, browser user agent, a session ID, and a cookie associated with the user. The evaluation component 280 may use a cookie graph to determine if the received user identification is related to another user identification.

Once it is determined that at least two user identifications relate to the same user, a consolidated data stream of the privacy preferences associated with the related user identifications is created, as indicated at block 440. The consolidated data stream is created to easily transmit the related user identification and privacy preferences to multiple applications.

As indicated at block 450, the consolidated data stream is communicated to one or more applications. Once the consolidated data stream is received, the information contained within the data stream (e.g. privacy preferences) is propagated across all relevant applications. For example, once a user chooses to opt out of all targeted ads in a first application and it is determined that the user has a user identification for a second application, then the user will be opted out of targeted ads in the second application, as well as, for the first application.

As can be seen, embodiments of the present invention are directed to maintaining privacy preferences based on one or more user identifications across multiple applications. It will be understood by those of ordinary skill in the art that the order of steps shown in the method 300 of FIG. 3 and the method 400 of FIG. 4 are not meant to limit the scope of embodiments of the present invention in any way and, in fact, the steps may occur in a variety of different sequences within embodiments hereof. For instance, the search engine might simultaneously access the event catalog for relevant events, as well as, access the search history store for a user's interest indicators. Any and all such variations, and any combination thereof, are contemplated to be within the scope of embodiments of the present invention.

While embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer memory storing computer-useable instructions that, when used by one or more computing devices, cause the one or more computing devices to perform a method for propagating and maintaining user privacy preferences across a plurality of applications, the method comprising:
    receiving a plurality of user identifications, each of the plurality of user identifications having an associated user privacy preference setting, wherein the associated user privacy preference setting is set by a user associated with each of the plurality of user identifications;
    determining that at least a first user identification and a second user identification of the plurality of user identifications relate to a particular user;
    determining that a first user privacy preference setting associated with the first user identification and a second user privacy preference setting associated with the second user identification, are not conflicting;
    creating a consolidated data stream of the first user privacy preference setting and the second user privacy preference setting;
    communicating the consolidated data stream to at least one application in a plurality of applications; and
    upon determining that the first user privacy preference setting and the second user privacy preference setting are not conflicting, propagating the consolidated data stream of the first user privacy preference setting and the second user privacy preference setting across the plurality of applications.

2. The memory of claim 1, wherein at least two of the plurality of user identifications have at least one browser property in common.

3. The memory of claim 2, wherein the at least one browser property comprises an Internet Protocol (IP) address or a user agent type.

4. The memory of claim 1, wherein at least two of the plurality of user identifications have at least two browser properties in common.

5. The memory of claim 4, wherein the at least two browser properties comprises an Internet Protocol (IP) address and a user agent type.

6. The memory of claim 1, wherein each of the user privacy preference setting is one or more of an opt-out preference, a targeted ad preference, a pop-up ad preference, and an absence of any user privacy preference.

7. The memory of claim 2, wherein in response to determining that at least two of the user identifications have at least one browser property in common, the method further comprises correlating the plurality of user identifications in an identification correlation map store.

8. The memory of claim 1, wherein the method further comprises constructing a table of cookies of at least two of the user identifications to determine if the user identifications relate to the same user.

9. The memory of claim 1, the method further comprises:
    determining that at least a third user identification and a fourth user identification of the plurality of user identifications relate to the particular user;
    determining that a third user privacy preference setting associated with the third user identification and a fourth user privacy preference setting associated with the fourth user identification, are conflicting;
    upon determining that the third user privacy preference setting and the fourth user privacy preference setting are conflicting, maintaining the respective user privacy preference settings associated with the third and fourth user identifications having the conflicting user privacy preference settings.

10. A system for maintaining user privacy preferences based on one or more user identifications across a plurality of applications, the system comprising:
    a computing device associated with one or more processors and one or more computer readable storage media;
    a data store coupled with the computing device; and
    a data processing device that:
        (1) receives one or more user privacy preferences associated with one or more user identifications associated with a user, wherein the one or more user privacy preferences are set by the user,
        (2) determines that at least one of the user identifications is related to at least one of the other user identifications,
        (3) determines that the one or more user privacy preferences associated with the one or more user identifications are not conflicting,
        (4) creates a consolidated data stream of the one or more user privacy preferences associated with at least one of the user identifications,
        (5) communicates the consolidated data stream to one or more applications, and
        (6) propagates the consolidated data stream across one or more relevant applications.

11. The system of claim 10, further comprising an identification correlation map store for storing the privacy preferences of user identifications and for determining that at least one of the user identifications is related to the other user identifications.

12. The system of claim 10, wherein the data processing device further comprises a receiving component, an evaluation component, and a communication component.

13. The system of claim 10, wherein the computing device further comprises a web browser capable of accessing and navigating the Internet.

14. One or more computer memory storing computer-useable instructions that, when used by one or more computing devices, cause the one or more computing devices to perform a method for maintaining user privacy preferences based on one or more user identifications across a plurality of applications, the method comprising:
    receiving a first user identification having a first associated user privacy preference set by a user, wherein the first user identification identifies the user, and wherein the first associated user privacy preference indicates the user's desired privacy settings;
    receiving a second user identification having a second associated user privacy preference set by the user, wherein the second user identification identifies the user, and wherein the second associated user privacy preference indicates the user's desired privacy settings;

determining that the first user identification and the second user identification have at least one browser property in common;

creating a consolidated data stream of at least the first and second associated user privacy preferences for the first and second user identifications; and communicating the consolidated data stream to one or more applications for propagating the first and second associated user privacy preferences for the user in the one or more applications.

15. The memory of claim 14, wherein the browser property is at least one of an IP address or a user agent type.

16. The memory of claim 14, wherein the first user identification and the second user identification have at least two browser properties in common.

17. The memory of claim 14, wherein each of the user privacy preferences is one or more of an opt-out preference, a targeted ad preference, a pop-up ad preference, and an absence of any user privacy preference.

18. The memory of claim 14, wherein in response to determining that the first user identification and the second user identification have at least one browser property in common, the method further comprises correlating the first user identification and the second user identification in an identification correlation map store.

19. The memory of claim 14, wherein the method further comprises constructing a table of cookies of the first user identification and the second user identification to determine if the first user identification has at least one browser property in common with the second user identification.

* * * * *